United States Patent Office 3,563,748
Patented Feb. 16, 1971

---

3,563,748
PHOTOGRAPHIC MATERIAL CONTAINING A FILTER DYE
Henri Depoorter, Mortsel-Antwerp, Guy Alfred Rillaers, Kontich, Felix Jan Moelants, Wilrijk-Antwerp, and Theofiel Hubert Ghys, Kontich, Belgium, assignors to Gevaert-Agfa N.V., Mortsel, Belgium, a Belgian company
Filed Feb. 15, 1967, Ser. No. 616,343
Claims priority, application Great Britain, Mar. 3, 1966, 9,351/66
Int. Cl. G03c *1/84*
U.S. Cl. 96—84                    6 Claims

ABSTRACT OF THE DISCLOSURE

A light-sensitive photographic material including a dye corresponding to the formula:

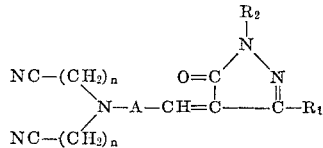

Figure 1:
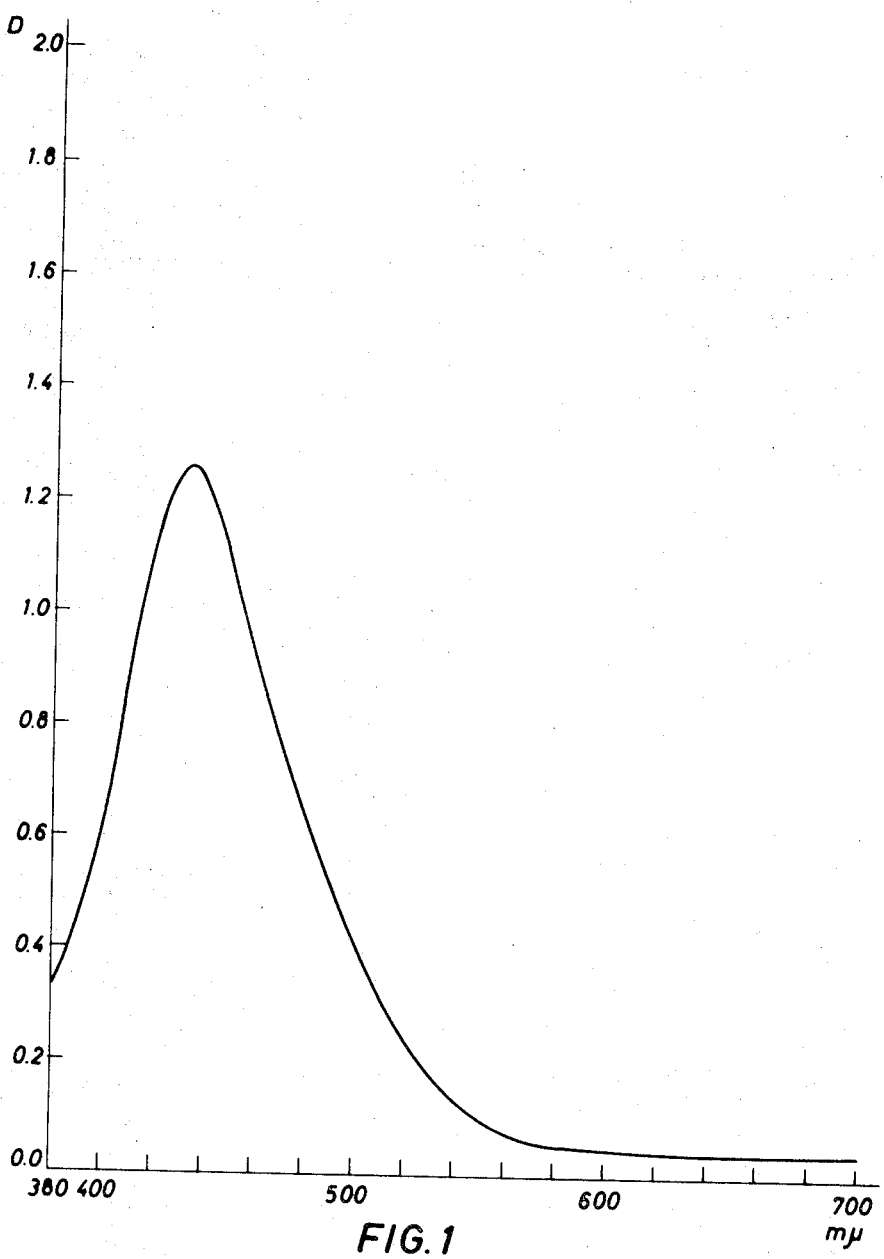

wherein:

A is an arylene nucleus, or an arylene nucleus forming part of a fused ring system,
each of $R_1$ and $R_2$ is an aryl group, at least one of said aryl groups being substituted directly or over —O—, —S—, —SO—, —SO$_2$—,

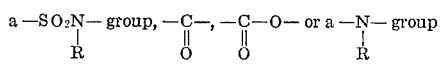

wherein R represents hydrogen or an alkyl group, with an alkyl group of 5 to 20 carbon atoms, and
$n$ represents 1, 2, or 3 is described. The photographic materials have excellent spectral absorption characteristics for filter purposes and are very resistant to diffusion.

---

This invention relates to a new class of dyes, to the preparation thereof and to their use in photographic materials.

As is known, it is necessary to provide in common photographic colour material a filter layer, which absorbs the blue light, between the blue-sensitive silver halide emulsion layer and the green-sensitized silver halide emulsion layer. This filter layer must meet a whole series of requirements. Summarized, the filter layer should have a well-determined absorption range corresponding to the inherent sensitivity range of the underlaying emulsion layer(s), it should be stable and photographically inert in respect of adjacent layers, the dyes incorporated therein should be fast to diffusion and be easily discharged during processing. Up to now no product, composition or material is known which simultaneously and fully meets the above requirements.

A colloid layer comprising colloidal silver is almost generally used since with this kind of layer the above requirements are best met. However, such layer does not possess the desired absorption characteristics in full and the colloidal silver therein may give rise to fog in the adjacent silver halide emulsion layers. Further, as known to one skilled in the art, a filter layer containing colloidal silver may give rise to difficulties in negative sound track copying on a duplicating reversal colour material.

Organic dyes have been proposed as substitutes for colloidal silver. Many classes of dyes, however, were always, in at least one respect, inferior to colloidal silver particularly as to the discolouration in photographic baths, so that additional baths e.g. containing a reducing agent such as hydrazine are prescribed in order to still obtain an acceptable discolouration.

It is an object of the present invention to provide a new class of dyes, which are discharged as easily as colloidal silver in the usual processing baths, do not induce fog in the adjacent layers, have excellent spectral absorption characteristics for filter purposes and are very resistant to diffusion.

The dyes according to the present invention are represented by the following general Formula I

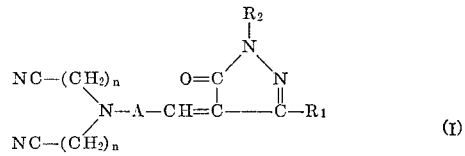      (I)

wherein:

A represents an arylene nucleus which may be substituted or condensed to form a fused ring system preferably however a phenylene radical which may be substituted e.g. with an alkyl group, a substituted alkyl group, an aryl group, a substituted aryl group, an alkoxy group, a halogen atom, a nitro group, a carbalkoxy group, a carboxy group, a cyano group, a sulpho group, an alkylsulphonyl group, an amido group, a sulfonamido group, a mercapto group, or an alkylmercapto group, each of $R_1$ and $R_2$ represent an aryl group at least one of the aryl groups being substituted, directly or over a bivalent radical such as a —O—, —S—, —SO—, —SO$_2$—,

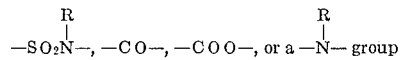

(wherein R represents a hydrogen atom, or an organic radical e.g. an alkyl group, a substituted alkyl group, an aryl group, a substituted aryl group, an aralkyl group, a substituted aralkyl group or a cycloalkyl group) by an alkyl group, and
$n$ represents 1, 2 or 3.

The structural formulae of some examples of dyes corresponding to general Formula I are listed in the following table.

TABLE

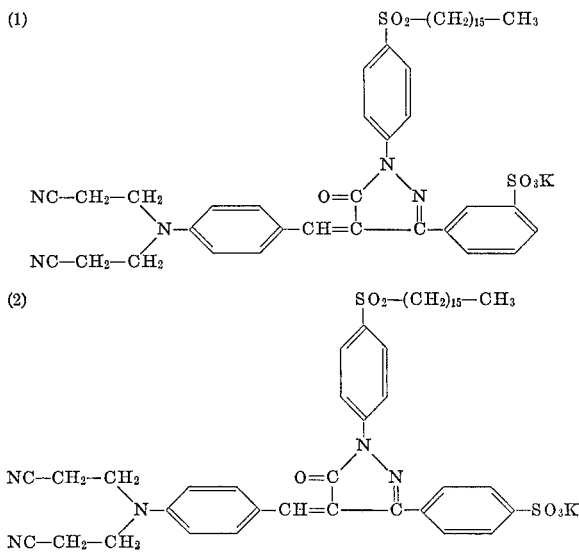

(3) 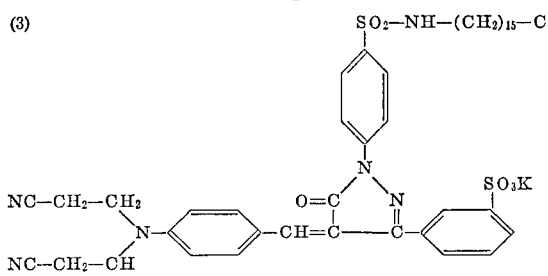
(4) 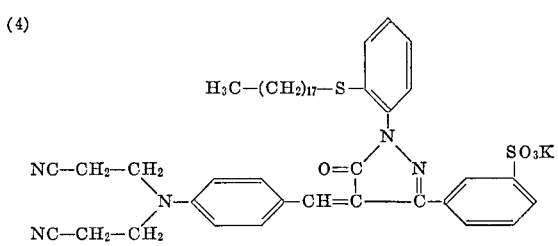
(5) 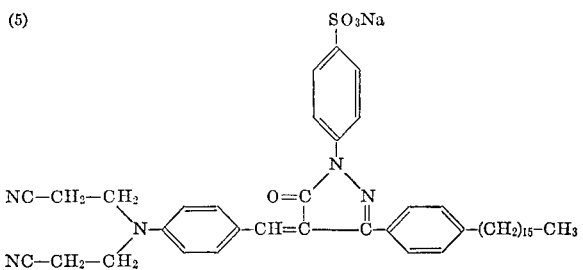
(6) 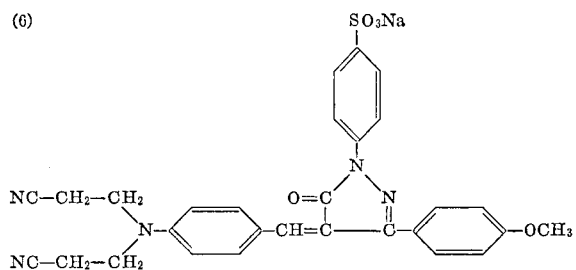
(7) 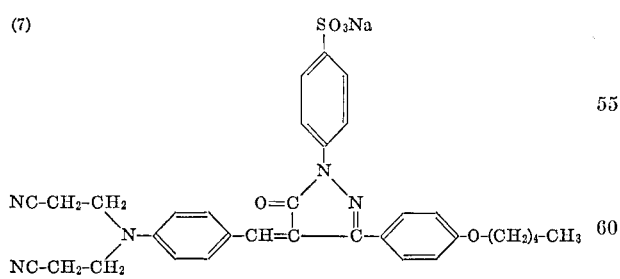
(8) 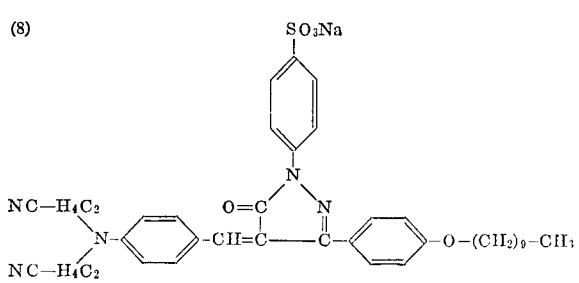
(9) 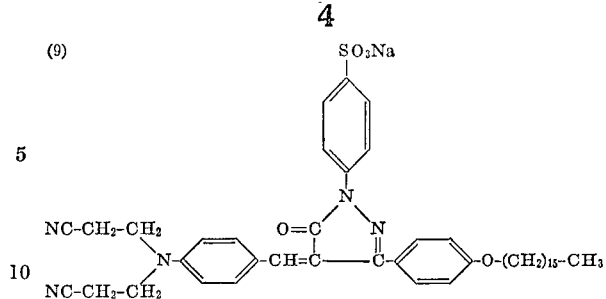
(10) 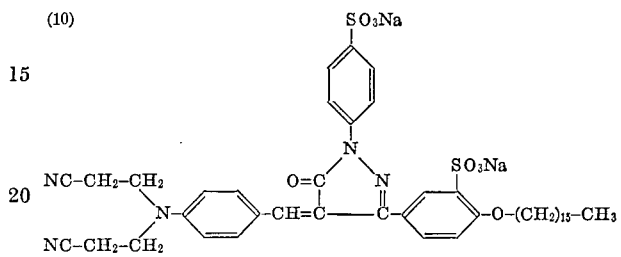
(11) 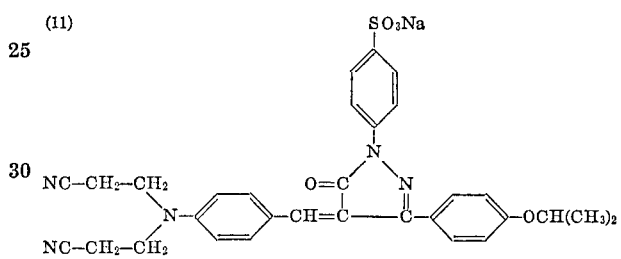
(12) 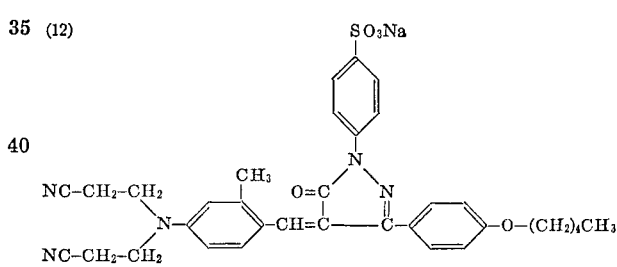
(13) 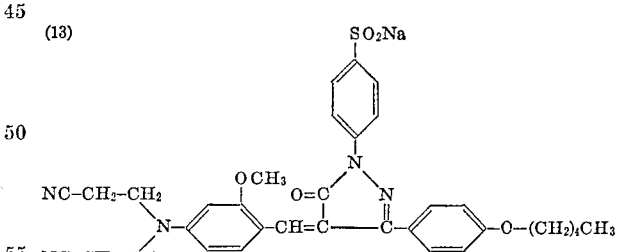
(14) 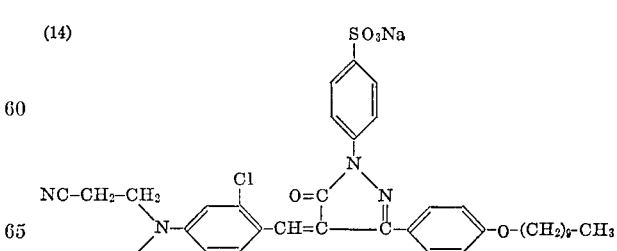
The dyes according to the present invention can be prepared by allowing to react a compound of the general Formula II:
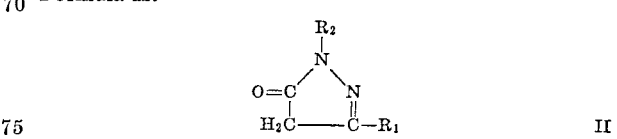

wherein $R_1$ and $R_2$ have the same value as in Formula I, with an aldehyde of the Formula III

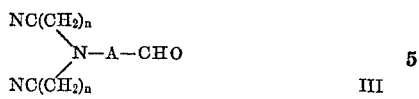

wherein A and $n$ have the same value as in Formula I. The reaction is preferably carried out in the presence of an inert solvent such as methanol, ethanol, butanol, ethylene glycol monomethylether, dimethylformamide, dimethyl sulfoxide and tetrahydro thiophene-1,1-dioxide.

The following illustrates the preparation of intermediates for the preparation of said dyes without, however, limiting the scope of our invention thereto.

PREPARATION A

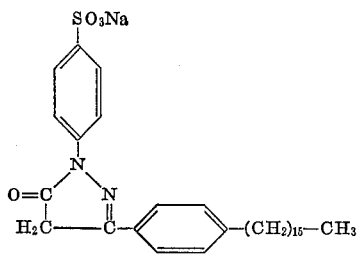

A warm solution of 20.1 g. (0.05 mole) of methyl-4-cetyl-benzoylacetate in 80 ml. of ethylene glycol monomethyl ether is added to a warm solution of 9.4 g. of 4-sulpho-phenylhydrazine and 7 g. of sodium acetate (trihydrate) in 30 ml. of water. The mixture is refluxed for 90 min. with stirring. After cooling, the pyrazolone is collected, washed with a little of water, methanol and ether and dried at 70°. Yield: 18 g. (64%). Melting point: above 260° C.

In a similar way are prepared:

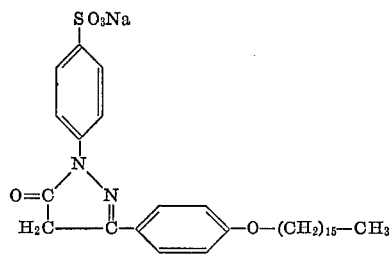

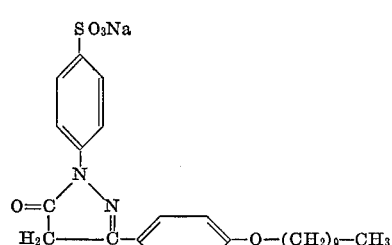

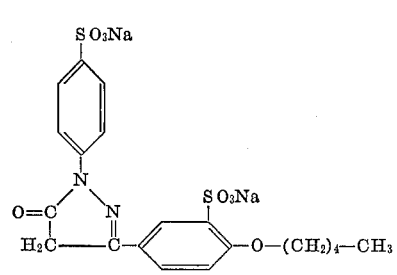

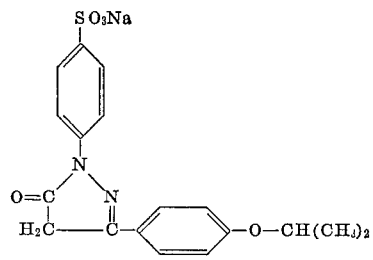

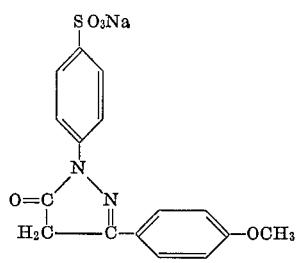

PREPARATION B

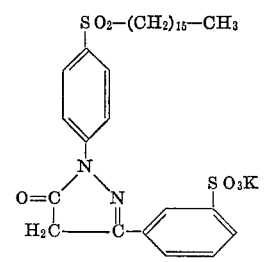

To a warm solution of 86.4 g. of 4-cetylsulphonyl-phenylhydrazine hydrochloride in 300 ml. of ethanol, 54 g. of ethyl-3-fluorosulphonyl-benzoyl acetate is added. After 15 min. of refluxing, 32 ml. of pyridine is added and refluxing is continued for 30 min. After having added 150 ml. of water followed by cooling, the precipitate is collected and dissolved in 1 litre of acetone. While stirring and gently boiling, a solution of 40 g. of potassium hydroxide in 120 ml. of water is added dropwise. Then 100 ml. of acetic acid are added dropwise whereupon the mixture is refluxed for 5 min. and cooled and the product is collected and dried. Yield: 66%.

In a similar way is prepared:

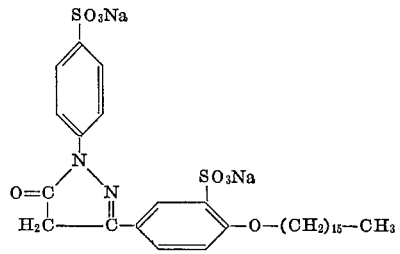

PREPARATION C

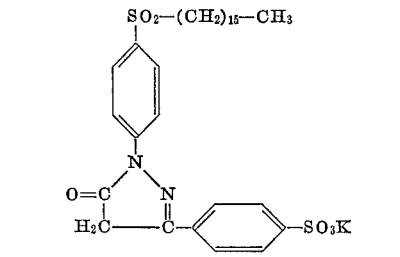

A mixture of 39.6 g. of 4-cetylsulphonyl-phenylhydrazine and 29.2 g. of ethyl-4-fluorosulphonyl-benzoylacetate is heated for 1 hour at 120–125°. The reaction product thus obtained is recrystallized from 1 litre of methanol. The fluorosulphonyl group in the pyrazolone so obtained is converted into a sulpho group as described in preparation B.

In a similar way are prepared:

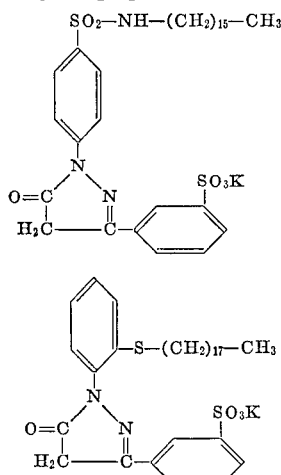

The aldehydes corresponding to general Formula III for use in the preparation of the dyes are prepared from the corresponding substituted N,N - bis(2 - cyanoethyl) anilines according to the Vilsmeier and Haack reaction using dimethylformamide as formylating agent. The substituted N,N - bis(2 - cyanoethyl)anilines are prepared from the corresponding substituted anilines by cyanoethylation according to the method of Braunholtz and Mann, J. Chem. Soc., 1953, 1817.

The following illustrates the preparation of dyes according to the present invention.

PREPARATION 1

The dyestuff of Formula 1 of the above table is prepared as follows:

A mixture of 6.8 g. of the pyrazolone of preparation B, 2.5 g. of 4[bis - (2 - cyanoethyl)amino - ]benzaldehyde and 50 ml. of pyridine is refluxed for 2 hours and then evaporated under diminished pressure. The residue is recrystallized from ethanol. Yield: 6 g. (70%). Absorption maximum: 456 nm. in methanol. $\epsilon = 2.63 \times 10^4$.

PREPARATION 2

The dyestuff of Formula 5 of the above table is prepared as follows:

A mixture of 5.7 g. of the pyrazolone of preparation A, 2.3 g. of 4[bis(2-cyanoethyl)amino-]benzaldehyde and 50 ml. of dimethyl-formamide is refluxed for 5 hours and then evaporated under diminished pressure. The residue is recrystallized from 75 cc. of methanol. Yield: 5.1 g. (60%). Absorption maximum (in methanol): 432 nm. $\epsilon = 3.71 \times 10^4$.

The dyestuffs listed in the following table were prepared analogously to those of preparations 1 and 2 above.

| Dyestuff of Formula: | Yield (percent) | Abs. max. (nm.) (in methanol) | $\epsilon$ |
|---|---|---|---|
| 2 | 69 | 457 | $2.98 \times 10^4$ |
| 3 | 77 | 445 | $2.77 \times 10^4$ |
| 4 | 66 | 455 | $1.99 \times 10^4$ |
| 6 | 76 | 433 | $4.33 \times 10^4$ |
| 7 | 68 | 433 | $3.80 \times 10^4$ |
| 8 | 62 | 433 | $2.46 \times 10^4$ |
| 9 | 47 | 435 | $3.88 \times 10^4$ |
| 10 | 52 | 438 | $2.01 \times 10^4$ |
| 11 | 65 | 435 | $3.68 \times 10^4$ |
| 12 | 54 | 445 | $3.53 \times 10^4$ |
| 13 | 60 | 450 | $3.96 \times 10^4$ |
| 14 | 68 | 435 | $3.09 \times 10^4$ |

Although, as said above, the dyestuffs according to the invention are excellently suitable for use in a yellow filter layer between the blue-sensitive layer and the green-sensitized layer of a photographic colour material it is evident that they can also be applied in any photographic material based on light-sensitive silver halide where easily dischargeable, non-migratory yellow dyestuffs are desired or necessary. Examples of other applications of these dyes are: in an antihalation layer between the support and a light-sensitive silver halide emulsion layer, in a filter layer between two light-sensitive silver halide emulsion layers or as screening dye in a light-sensitive layer.

The dyes according to the present invention can be incorporated into a photographic material according to techniques known by those skilled in the art for incorporating e.g. colour couplers and optical sensitizers.

The dyestuff is for instance dissolved in an appropriate solvent (in most cases this solvent can be water) and then added to a gelatin solution. To this solution can also be added appropriate coating aids and hardening agents. The solution thus obtained can then be applied as a layer according to known processes.

In the following table are listed the amounts of the dyes described above which have to be used in a gelatin colloid layer to obtain an optical density equal to 1.0, measured at the $\lambda_{max}$ observed for the dyestuff in question.

| Dyestuff of Formula: | Mg. dyestuff/sq. m. | $\lambda$ max. (nm.) |
|---|---|---|
| 1 | 525 | 450 |
| 2 | 410 | 435 |
| 3 | 500 | 438 |
| 4 | 405 | 460 |
| 5 | 360 | 435 |
| 6 | 225 | 436 |
| 7 | 250 | 435 |
| 8 | 300 | 434 |
| 9 | 350 | 435 |
| 10 | 375 | 445 |
| 11 | 300 | 440 |
| 12 | 300 | 445 |
| 13 | 240 | 435 |
| 14 | 400 | 435 |

In comparison with known filter dyes and antihalation dyes the dyestuffs according to the present invention are particularly characterized by the fact that in said dyestuffs a good fastness to diffusion is combined with a rapid and complete discolouring or discharging in photographic processing baths.

The following examples illustrate more specifically the preparation of filter layers according to the present invention.

Example 1

A coating solution of the following composition:

|  | G. |
|---|---|
| Inert gelatin | 10 |
| Dyestuff 7 | 3 |
| Chrome alum | 0.2 |
| Sodium 2-methyl-7-ethylundecane sulphate | 0.375 |
| Distilled water up to | 600 | and having pH 5.62, is coated on a subbed cellulose triacetate support pro rata of 60 g./sq.m. so that 1 g. of gelatin and 300 mg. of dyestuff are present per sq.m. The spectral absorption characteristics of the layer obtained are represented in FIG. 1.

This solution can be used for providing in a conventional way a yellow filter layer between the green-sensitized and the blue-sensitive silver halide emulsion layers of a multilayer colour material. With the above mentioned concentration of dyestuff the green- and red-sensitized silver halide emulsion layers are sufficiently shielded against light corresponding to the inherent sensitivity of said layers.

Example 2

This example is analogous to Example 1 with the difference however that 4.125 g. of dyestuff 9 are used instead of 3 g. of dyestuff 7.

Figure 2:
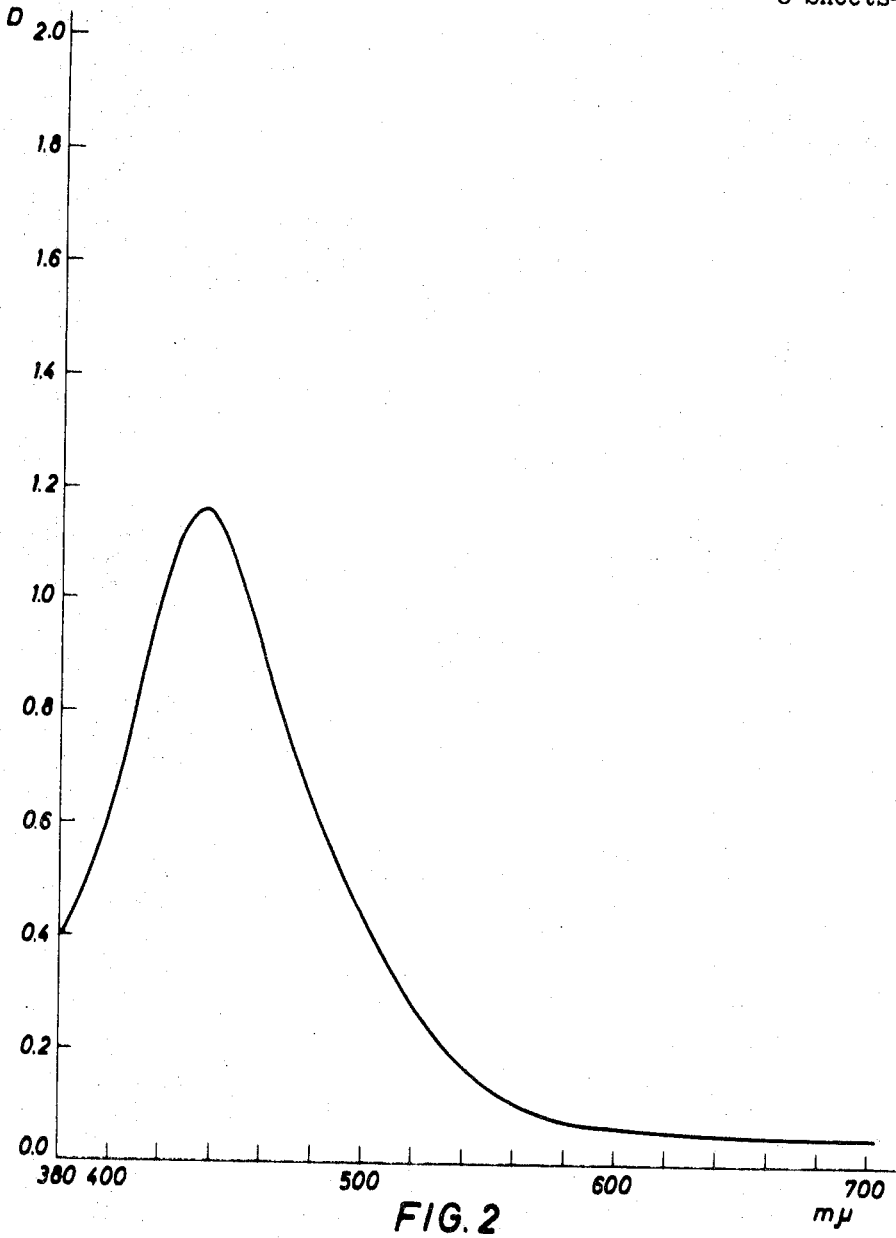

In this way a material is obtained, the filter layer of which comprises per sq.m. 1 g. of gelatin and 412.5 mg. of dyestuff 9. The absorption characteristics of this layer are represented in FIG. 2.

Example 3

A coating solution intended for providing an antihalation undercoat containing a non-migratory dyestuff has the following composition:

Inert gelatin—30 g.
Dyestuff 5—4 g.
Saponine—0.6 g.
4% formaldehyde—0.75 ml.
Demineralized water up to 1000 g.

This solution ready for coating has pH 6.1.

Figure 3:
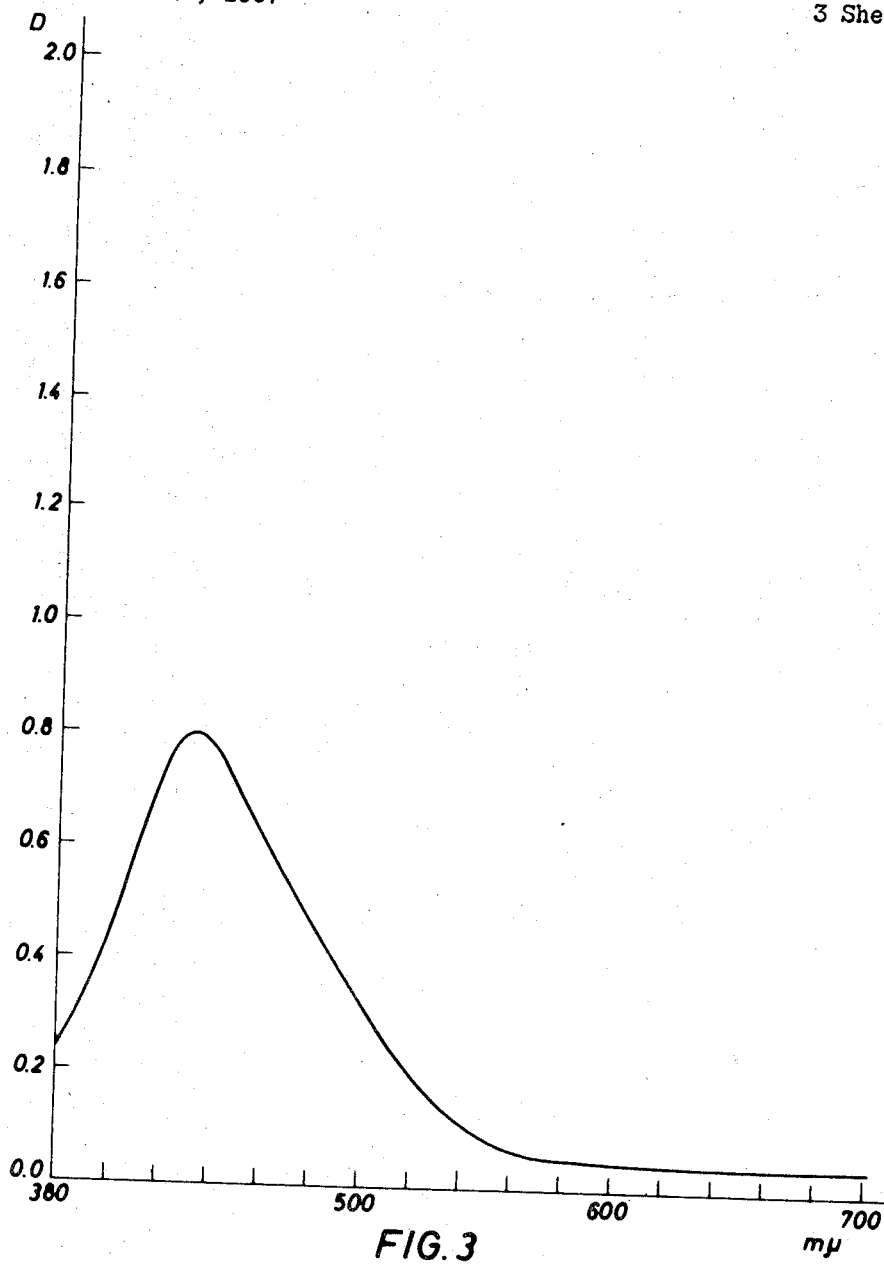

The solution is applied to a subbed polyethylene terephthalate support pro rata of 70 g./sq.m. so that 2.1 g. of gelatin and 0.280 g. of dyestuff are present per sq.m. The spectral absorption characteristics of the layer obtained are represented in FIG. 3.

Afterwards, a non-sensitized silver halide emulsion layer may be applied to the above antihalation layer. The coloured undercoat assures an excellent antihalation action in respect of the emulsion applied without adversely affecting the sensitivity of the emulsion. The antihalation layer discolours completely after a treatment in the classical black-and-white developing and fixing baths.

We claim:

1. A light-sensitive photographic element comprising a light-sensitive silver halide material and a dyestuff corresponding to the formula:

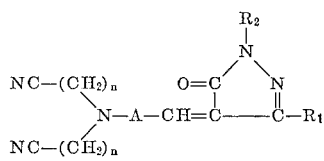

wherein:
A is an arylene nucleus, or an arylene nucleus forming part of a fused ring system,
each of $R_1$ and $R_2$ is an aryl group, at least one of said aryl groups being substituted directly or over —O—, —S—, —SO—, —SO$_2$—, a —SO$_2$N— group, $-\underset{\overset{\parallel}{O}}{C}-$, $-\underset{\overset{\parallel}{O}}{C}-O-$ or a —N— group
   |                                                                              |
   R                                                                              R wherein R represents hydrogen or an alkyl group, with an alkyl group of 5 to 20 carbon atoms, and $n$ represents 1, 2, or 3 in a light-sensitive silver halide emulsion layer, a water permeable colloid anti-halation or filter layer.

2. A light-sensitive photographic material according to claim 1 wherein $R_1$ or $R_2$ are substituted with a sulpho group in acid or salt form.

3. A light-sensitive photographic material according to claim 2 wherein the dyestuff corresponds to one of the following structural formulae:

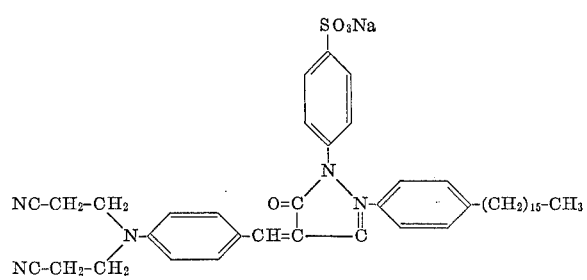

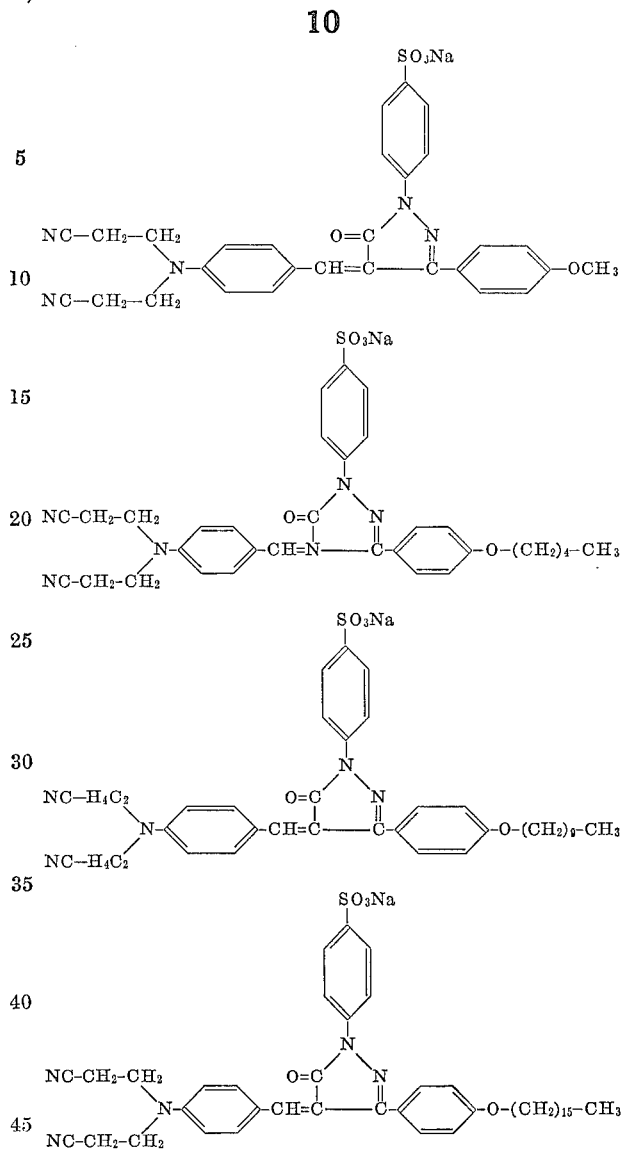

4. A light-sensitive photographic element according to claim 1 including a water-permeable colloid anti-halation layer which contains said dye.

5. A light-sensitive photographic element according to claim 1 including at least one light-sensitive silver halide emulsion layer.

6. A light-sensitive element according to claim 1 wherein the light-sensitive material is included in a water-permeable colloid layer.

References Cited

UNITED STATES PATENTS

| | | | |
|---|---|---|---|
| 2,688,540 | 9/1954 | Ganguin et al. | 96—84 |
| 2,688,541 | 9/1954 | Ganguin et al. | 96—84 |
| 2,709,136 | 5/1955 | Ganguin et al. | 96—84 |
| 3,316,091 | 4/1967 | Rossi et al. | 96—84 |

RONALD H. SMITH, Primary Examiner

U.S. Cl. X.R.

252—300; 260—240.9